US012760245B2

(12) United States Patent
Nguyen et al.

(10) Patent No.: US 12,760,245 B2
(45) Date of Patent: Oct. 13, 2026

(54) VEHICLE SHAMPOO COMPOSITION CONTAINING GRAPHENE

(71) Applicant: Illinois Tool Works Inc., Glenview, IL (US)

(72) Inventors: Chi Quang Nguyen, Glenview, IL (US); John Isidoro Escoto, Jr., Glenview, IL (US); Tze-Lee Phang, Glenview, IL (US); Trey Anthony Boening, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 311 days.

(21) Appl. No.: 18/438,823

(22) Filed: Feb. 12, 2024

(65) Prior Publication Data

US 2024/0287411 A1 Aug. 29, 2024

Related U.S. Application Data

(60) Provisional application No. 63/446,717, filed on Feb. 17, 2023.

(51) Int. Cl.

*C11D 1/00* (2006.01)
*B08B 3/04* (2006.01)
*C11D 1/14* (2006.01)
*C11D 1/75* (2006.01)
*C11D 1/83* (2006.01)

(Continued)

(52) U.S. Cl.

CPC .............. *C11D 3/0036* (2013.01); *C11D 1/83* (2013.01); *C11D 3/12* (2013.01); *C11D 3/33* (2013.01); *C11D 3/373* (2013.01); *C11D 3/43* (2013.01); *C11D 1/146* (2013.01); *C11D 1/662* (2013.01); *C11D 1/75* (2013.01)

(58) Field of Classification Search

CPC .. C11D 1/00; C11D 1/14; C11D 1/662; C11D 1/665; C11D 1/75; C11D 1/83; C11D 3/162; C11D 3/33; C11D 3/373; C11D 3/43; B08B 3/04

See application file for complete search history.

(56) References Cited

U.S. PATENT DOCUMENTS 7,318,871 B2 1/2008 Egan et al.
12,338,415 B2 * 6/2025 Nguyen ............... C11D 3/3707

(Continued)

FOREIGN PATENT DOCUMENTS

EP 4166637 A1 4/2023
KR 102227273 * 3/2021 ............... C11D 3/04
KR 102227273 B1 3/2021

OTHER PUBLICATIONS

Extended EP Search Report issued in corresponding EP Appln. No. 24158128.9, dated Jul. 4, 2024.

*Primary Examiner* — Brian P Mruk
(74) *Attorney, Agent, or Firm* — MaxGoLaw PLLC

(57) ABSTRACT

A process for imparting a coating to a vehicle surface is provided. A composition is applied to the vehicle surface. The vehicle cleaning composition is provided that includes a graphene, surfactants, a chelating agent, with water as a majority by weight of the composition. A residual of the composition results in a coating on the vehicle surface. The coating includes a graphene alone or graphene in a siloxane-based matrix. A vehicle cleaning composition is also provided for forming such coatings on a vehicle surface.

12 Claims, 6 Drawing Sheets

| Graphene Car Shampoo Competitors | RX Pro Graphene Car Shampoo | Graphene Car Shampoo A |
|---|---|---|
| Packaging | Pearlescent Gold, Screw Cap 16oz | Transparent w/Smoky Formula, Screw Cap 16oz |
| Concentrate to Bucket Ratio | 1 ounces : (1 gallon) | 1 ounces : (1 gallon) |
| Foaming Characteristics | | |
| pH level | 6.5 | 9.5 |
| Scent | Floral | Bubble Gum |
| Foam Height | 2 1/4 inch | 2 1/4 inch |
| Formulation Color | Charcoal, Thick | Smoky Gray, Thick |
| Foam Dissipation Time | >20 minutes | >20 minutes |

(51) Int. Cl.

| | |
|---|---|
| ***C11D 3/00*** | (2006.01) |
| ***C11D 3/12*** | (2006.01) |
| ***C11D 3/33*** | (2006.01) |
| ***C11D 3/37*** | (2006.01) |
| ***C11D 3/43*** | (2006.01) |
| *C11D 1/66* | (2006.01) |

(56) References Cited

U.S. PATENT DOCUMENTS

| | | | | |
|---|---|---|---|---|
| 2023/0008182 | A1* | 1/2023 | Huang | C09G 1/04 |
| 2023/0257683 | A1* | 8/2023 | Nguyen | C11D 1/75<br>510/189 |

* cited by examiner

| Graphene Car Shampoo Competitors | RX Pro Graphene Car Shampoo | Graphene Car Shampoo A |
|---|---|---|
| Packaging | Pearlescent Gold, Screw Cap 16oz | Transparent w/Smoky Formula, Screw Cap 16oz |
| Concentrate to Bucket Ratio | 1 ounces : (1 gallon) | 1 ounces : (1 gallon) |
| Foaming Characteristics | | |
| pH level | 6.5 | 9.5 |
| Scent | Floral | Bubble Gum |
| Foam Height | 2 1/4 inch | 2 1/4 inch |
| Formulation Color | Charcoal, Thick | Smoky Gray, Thick |
| Foam Dissipation Time | >20 minutes | >20 minutes |

FIG. 1

| | Graphene Car Shampoo A | RX Graphene Car Shampoo |
|---|---|---|
| Cleaning | +++ | +++ |
| Water Beading | +++ | +++ |
| Water Dissipation | ++ | ++ |
| Shine | +++ | +++ |
| Lubricious | ++ | +++ |
| Bucket Foam | +++ | +++ |
| Foam Transference | ++ | +++ |
| Foam Dissipation | +++ | +++ |
| Fragrance | +++ | +++ |

+++ : Excellent
++ : Good
+ : OK
- : Marginal

FIG. 2

VEHICLE SHAMPOO COMPOSITION CONTAINING GRAPHENE

RELATED APPLICATIONS

This application is a non-provisional application that claims priority benefit to U.S. Provisional Application Ser. No. 63/446,717 filed Feb. 17, 2023, the contents of which are hereby incorporated by reference.

FIELD OF THE INVENTION

The present invention in general relates to a cleaning composition for various substrates and to a substrate coated with such composition, and in particular to an aqueous composition for cleaning vehicle surfaces, and also providing a durable protective surface coating that imparts water repellency and weathering protection properties to the underlying surface through inclusion of graphene.

BACKGROUND OF THE INVENTION

Vehicles tend to accumulate a variety of surface contaminants such as grime, brake dust, insect splatter, tar, tree sap, sticker adhesive and bird droppings. The severity of this tendency depends on the type of vehicle, season, driving habits, weather, traffic conditions, among various other factors. If the contaminants have sufficient residence time on the vehicle surface, subsequent removal becomes difficult and eventually leads to surface damage such as pitting. A common feature of these surface contaminants is that they tend to be lipophilic and as a result, are not easily removed with soap or even detergents absent mechanical forces. The removal of such stains with manual rubbing is both time consuming and can lead to underlying surface marring. Removal is further complicated when the vehicle surface is angled so that sprayed cleaning compositions run off or the target stain is not readily accessible such as when on a vehicle roof, fascia, or mud flap.

The current surface treatment and organic solvent-based products are time consuming to use from a professional standpoint and for a consumer represents another product that must be purchased and stored to properly clean a vehicle. While products capable of combining the functions of an aqueous detergent with that of a lipophilic stain remover have been made, as detailed for example in U.S. Pat. No. 5,660,641 such products have met with limited success as the applied solutions tend to run off vehicle surfaces too quickly to properly wet and lift a lipophilic stain thereby leaving a user to yet again resort to manual force to scrub the lipophilic stain from the vehicle surface. Any residual coating while imparting shine and UV protection tends to be readily debrided from the surface.

Various non-caustic and environmentally safe components of cleaning agents have been demonstrated to be capable of removing greasy and oily soils from a variety of surfaces to be cleaned. For example, a non-caustic cleaner is described in U.S. Pat. No. 4,511,488 which comprises d-limonene. The cleaning composition is effective for industrial cleaning tasks, such as those in machine shops, automotive service centers, food processing industries, where oily and particulate soils accumulate. Unfortunately, a clean, dry surface is receptive to accumulation of new deposits of greasy and oily soils.

Thus, there exists a need for an aqueous vehicle surface cleaning composition that can lift stains while providing a durable surface protective coating for both porous and semiporous automotive hard surfaces. There further exists a need for an aqueous vehicle surface cleaning composition capable of lifting lipophilic stains. There further exists a need for an aqueous vehicle surface cleaning composition that is operative as a prewash or standalone stain remover that can be sprayed-on and wiped-off after the stain has been lifted from the underlying vehicle surface.

SUMMARY OF THE INVENTION

A process for imparting a coating to a vehicle surface is provided. A composition is applied to the vehicle surface. The vehicle cleaning composition is provided that includes a graphene, surfactants, a surface additive agent, with water as a majority by weight of the composition. A residual of the composition results in a coating on the vehicle surface. The coating includes a graphene alone or graphene in a siloxane-based matrix. A vehicle cleaning composition is also provided of forming such coatings on a vehicle surface.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 is a comparative table of an existing graphene based car shampoo (shampoo A) and an embodiment of the inventive graphene based car shampoo composition (RX Pro™);

FIG. 2 is a chart summarizing performance parameters of the existing graphene based car shampoo (shampoo A) and the embodiment of the inventive graphene based car shampoo composition (RX Pro) presented in FIG. 1;

DETAILED DESCRIPTION OF THE INVENTION

Figure 3:
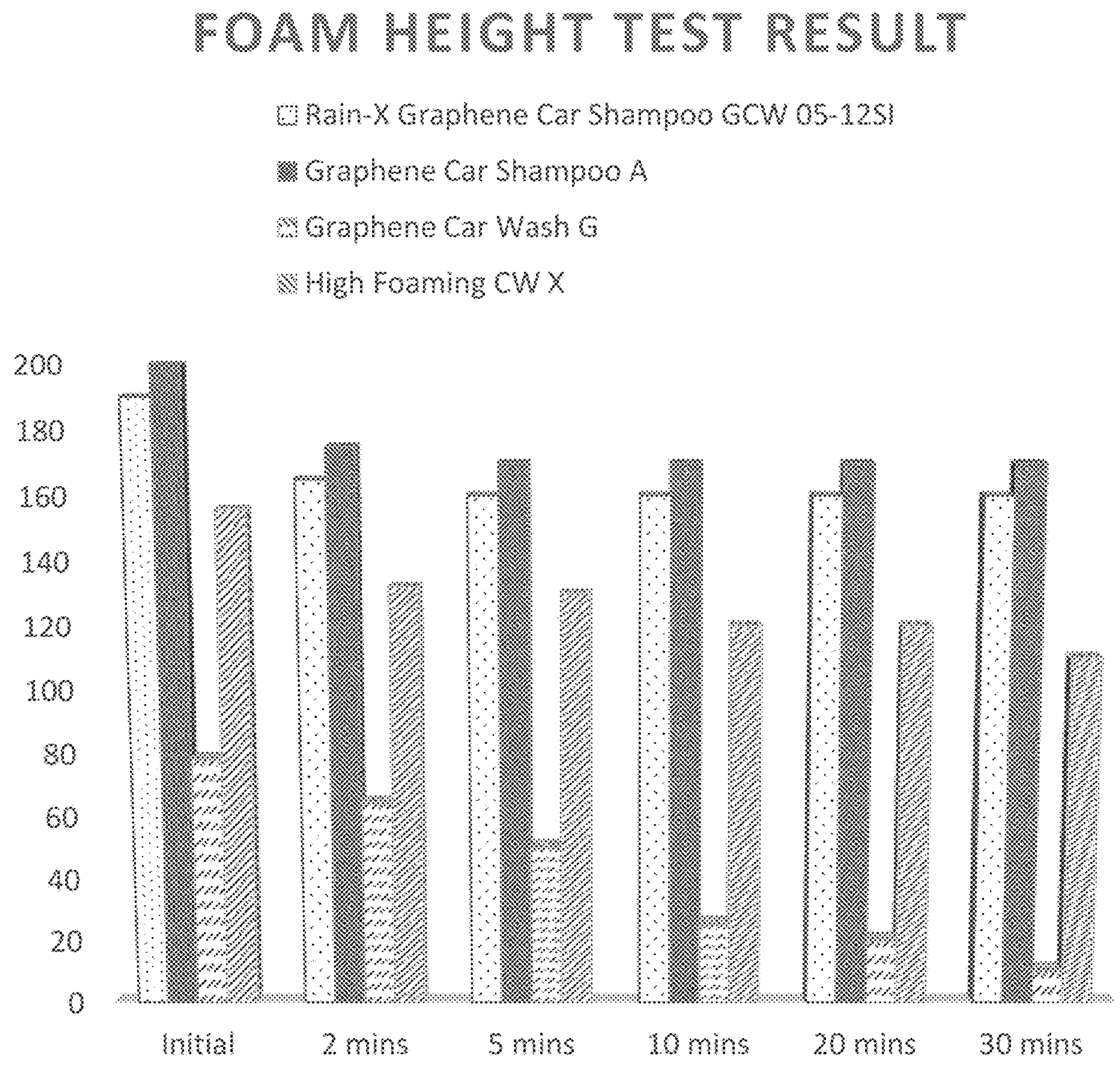
FIG. 3 is a bar graph of foam height versus time for an embodiment of the inventive graphene based car shampoo composition (Rain-X™) relative to graphene based car shampoo A, graphene car wash G, and high foaming CW X.

The present invention has utility as a vehicle exterior and interior hard surface cleaning composition that is described herein synonymously as a vehicle shampoo. An inventive composition includes at least one graphene dispersion for treating both non-porous and semiporous automotive hard surfaces. Graphene in the composition is operative as a mild mechanical abrasive to surface debris from the surface faces and imparts hardness to the resulting residual shiny coating. A multi-surface treatment is present to form a film on the surface and/or to impart the hard surface cleaning performance. One or more silanol-terminated polydimethylsiloxane and phenyltrimethoxysilane components are used in an inventive composition for detailing a vehicle to clean and polish the vehicle surface and to impart a high luster finish. One or more gloss enhancers are present in some inventive embodiments to provide a gloss to the Finish.

Some embodiments of the inventive aqueous vehicle shampoo contain anionic, amphoteric, and non-ionic sugar based and alcohol ethoxylate surfactants; a glycol ether solvent, and a chelating agent. It has been determined that combinations based on these formulations provide effective cleaning and removal of traffic films and contaminants from the vehicle exterior surfaces. Incorporation of graphene nanoplatelets in addition to silanol-terminated polydimethylsiloxane and phenyltrimethoxysilane act to form a network/matrix deposited on the cleaning surfaces in order to provide durable protection against weather elements and stains. In specific inventive embodiments, dimethicone PG-diethylammonium chloride (CAS 588707-20-4) is added to provide water repellency without buildups and to dissipate rinse water to inhibit water spots. In addition, the graphene nanoplatelets also provide lubrication benefit to the treated surface during and after the wash, thus minimizing scratch and mar to the treated surfaces. Embodiments of the inventive formulation are thickened by natural polymers or modified natural polymers-cellulosics, starches, polysaccharides alkali-swellable emulsion (ASE) type, hydrophobically modified alkali-swellable emulsion (HASE) type polymer, hydrophobically modified, ethoxylated urethane resins (HEUR), or combinations thereof, to create a stable structured liquid. The mixture of surfactants and thickening polymer deliver rich fine dense lather that enhance the cleaning. An ampholytic terpolymer is added to provide anti-static and additional lubricity to the treated surface as well as a silky skin feel and moisturization to the product users.

Numerical ranges cited herein are intended to recite not only the end values of such ranges but the individual values encompassed within the range and varying in single units of the last significant figure. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

The following description of various embodiments of the invention is not intended to limit the invention to these specific embodiments, but rather to enable any person skilled in the art to make and use this invention through exemplary aspects thereof.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also, as used herein, "and/or" refers to and encompasses any and all possible combinations of one or more of the associated listed items, as well as the lack of combinations when interpreted in the alternative ("or").

As used herein, graphene is defined as a two-dimensional material constructed by close-packed carbon atoms including a single-layer graphene, double-layer graphene, few-layer graphene, and graphene nanoplatelets.

As used herein double-layer graphene is defined as a stack graphene of two layers, few-layer graphene is defined as a stack of graphene of 3-10 layers, graphene nanoplatelet is defined as a stack of graphene of more than 10 layers. The graphene materials can be made by chemical or mechanical exfoliation of graphite, chemical vapor deposition, physical vapor deposition, microwave plasma, sonication/cavitation in solvent, organic synthesis, and epitaxy growth on a substrate.

As used herein, graphene oxide is defined as graphene with various oxygen-containing functionalities such as epoxide, carbonyl, carboxyl, and hydroxyl groups and a total oxygen content of 10-60 weight percent, typically around 20-50 weight percent.

As used herein, reduced graphene oxide is defined as graphene oxide that has been chemically or thermally reduced with a total oxygen content of typically in the range of 10-50 precent depending on the extent of the reduction.

As used herein, a nanoplatelet is defined as having planar dimensional in orthogonal direction of each independently between 2 and 20 nanometers.

Embodiments of the inventive composition form a protective barrier on porous and semiporous vehicle surfaces and that protective barrier imparts water repellency and weathering protection properties to the finish. The water repellency or hydrophobicity means water will be repelled instantaneously, i.e., water will bead up and roll off the surface along with most dust, grime, or mud because they are prevented from forming a bond to the vehicle hard surface, as opposed to accumulating on the surface and any remaining dust on the vehicle surface can be removed with less effort. Snow and ice do not stick to the treated surface and mud just slides off. In specific inventive embodiments, additional components may be added to the composition if needed such as preservative system, fragrance, UV stabilizer, antifoaming agent, or an antioxidant.

Vehicles surfaces amenable to cleaning by an inventive composition and protection by a residual high shine film coating formed therefrom illustratively includes tires, exterior vehicle trim, interior vehicle trim, dashboard surfaces, and door trim.

Different application methods for embodiments of the hard surface treatment composition. Illustratively include using aerosol spray, liquid spray, or wipes to deliver the hard surface treatment composition to the automotive and other hard surfaces.

Not to be limited to a particular theory, the graphene present in an inventive composition interacts with other substances such as dust particles and can attach themselves to the dust particles to facilitate the cleaning process and also to keep the treated surface clean and easier to clean. The low surface energy of graphene also complements siloxanes in the film coating to inhibit dirt and debris adhesion and hardens the resulting film coating against abrasion thereby significantly improving the surface cleaning composition. The inventive compositions when enhanced by these aqueous dispersions of graphene results in the treated vehicles surfaces receiving the afore-mentioned enhanced anti-dust properties and at the same time glass surfaces are less likely to exhibit fogging. Therefore, these aqueous dispersions of graphene can be used to adjust the hydrophobic or hydrophilic properties of the treated surfaces. As a result, treated surfaces shed dust naturally, look cleaner/fresher, and require less manual maintenance.

Graphene is layered $sp^2$ hybridized carbon atoms in a honeycomb-like, 2-dimensional sheet. Graphene is known to have excellent mechanical strength and flexibility, thermal and electric conductivities, and much higher optical cross section relative to many polymer coatings. Graphene as used in the present invention has a maximal linear extent in the three orthogonal X-Y-Z directions of between 3 and 50 nm, and secondary linear extent to at least 20 percent of the maximal linear extent. In addition, the graphene has an aspect ratio between about 25 and 25,000 between the maximum linear extent and the minimum linear extent, synonymously referred to herein as thickness. Ultra-thin graphite with average thickness is between 20 to 100 nm is also considered as a graphene-type material which can give similar performance enhancement like graphene in many real-world applications. Typical loading of graphene in an inventive composition range of from 0.001 to 1 total weight percent.

Graphene-type materials operative in the present invention include single-layer graphene, double-layer graphene, few-layer graphene, graphene oxide (GO), reduced graphene oxide (rGO), exfoliated graphene nanoplatelets, and ultra-thin graphite because all of these materials can enhance properties of compositions to which they are added.

In inventive compositions, the graphene can be single layer graphene, few-layer graphene, or multi-layer graphene nanoplatelet, or a combination thereof. Graphene nanoplatelet is low cost and has an easy-handling nature as compared to single layer graphene. The thickness and size of graphene or graphene nanoplatelets can be adjusted to meet the processing requirements, coating quality, and coating performance needs. In addition to graphene or graphene nanoplatelet, other additives may be added in the formulation to provide different properties and functionalities. Such additives include but are not limited to graphite, carbon black, carbon fibers, carbon nanotubes, metallic or ceramic flakes or particles.

Embodiments of the inventive cleaning composition are based on non-ionic surfactants. Non-ionic surfactants operative herein are soluble in water, and $C_2$-$C_8$ alcohols used herein. Other types of surfactants, namely anionic and/or cationic may also be present in some inventive embodiments.

Non-ionic surfactants operative herein in some inventive embodiments have hydrophile/lipophile balance (HLB) values between 8 and 14. Classes of non-ionic surfactants operative herein include $C_9$-$C_{24}$ fatty acid esters, $C_{12}$-$C_{24}$ fatty alcohol ethers, $C_{10}$-$C_{24}$ amine oxides, nonylphenol ethoxylate, alkyl polyglucosides with $C_8$-$C_{16}$ alkyl chain, each alone or any of the aforementioned in combination. Other alcohol alkoxylates operative herein have the general formula:

$$R—O—(CH_2CH(CH_3)O)_x(CH_2CH_2O)_yH$$

where R is $C_4$-$C_{22}$ linear or branched chain alkyl or mixtures thereof; x has a value of from 2 to 20; y has a value of from 0 to 15, or the general formula:

$$RO—(CH_2CH_2O)_n—H$$

where n is average moles of ethylene oxide (EO) and R is a $C_9$-$C_{18}$ alkyl.

Specific non-ionic surfactants operative herein illustratively include alcohol $C_{12}$-$C_{15}$ ethoxylated propoxylated, $C_{12}$-$C_{14}$, ethoxylated, $C_{9-11}$ ethoxylated alcohols having EO values from 2.5-9, or combinations thereof. In some inventive embodiments, EO 2.5 $C_{9-11}$ ethoxylated alcohol is used in combination with one or more EO 6-9 $C_{9-11}$ ethoxylated alcohols. The ratio of EO 2.5:EO 6-9 $C_{9-11}$ ethoxylated alcohols being between 0.1-1:1. In still other embodiments, the mixing 2.5 EO and 6-9EO $C_{9-11}$ ethoxylated alcohols are used in combination with a non-ionic amine oxide. Typical loadings of all non-ionic surfactants present in an inventive composition range from 0.5 to 38 total weight percent and in specific embodiments between 2.5 and 20 total weight percent.

The solvent system of an inventive composition includes water, specifically deionized water (DI) as the majority by weight solvent.

Other additives present in certain embodiments of an inventive composition illustratively include a siloxane, a siloxane coupling agent, a secondary solvent, a biocide, a wetting agent, a water repellent, a pH modifier, a fragrance, a viscosity builder, fragrance, a skin conditioner, a UV stabilizer, a preservative, or a combination thereof.

An inventive composition in some inventive embodiments also includes a reactive siloxane The siloxane is liquid at 25° C. and has units according to formula (I):

$$R^1{}_nSiO_{4-m/2} \quad (I)$$

where $R^1$ is $C_1$-$C_6$ alkyl, or $C_0$-$C_6$ alkyl hydroxyl groups and n has a value of from 0 to 3 and the cationic emulsifier lacks a halogen containing counter ion.

Other siloxanes operative in the reactive siloxane oil-in-water emulsion include linear siloxanes of the general formula (II):

$$R^2—(SiO(R^2)_2)_n—(SiO(R^3)_aR^2{}_{2-a})_z—SiR^2{}_3 \quad (II)$$

where $R^2$ is $C_1$-$C_{20}$ alkyl, $C_2$-$C_{18}$ alkyl, or $C_6$-$C_{20}$ alkyl, and $R^3$ is a siloxane side chain (III):

$$—O—(SiO(R^2)_2)_nSiR^2{}_3 \quad (III)$$

where n is an integer with a value of from 0 to 100,000; a is an integer with a value of from 0 to 2, inclusive; and z is an integer with a value of from 0 to 100, inclusive.

The siloxane has a viscosity of from 1 to 1,000,000 mPa·s at 25° C. Exemplary siloxanes include polydihydrocarbyl siloxane; polydimethyl siloxanes; polydimethyl polymethyl phenyl siloxanes such as cyclic polydimethyl siloxanes; linear siloxanes such as α,ω silanol end-blocked polydimethyl siloxane, α,ω trimethyl silyl end-blocked polydimethyl siloxane, dimethyl siloxane methyl phenyl siloxane copolymers, dimethyl siloxane methyl alkyl ($C_{12-18}$) siloxane copolymers; branched siloxane polymers; and vinyldimethyl silyl end-blocked polydimethyl siloxanes; or combinations thereof. Cyclic polydimethyl siloxanes operative herein include octamethyl cyclotetrasiloxane and decamethyl cyclopentasiloxane. A siloxane is typically present from 0 to 10 total weight percent and in specific embodiments between 0.5 and 5 total weight percent.

In some inventive embodiments, a coupling agent is added to react with the siloxane in forming a coating matrix in which graphene is embedded. Coupling agents operative herein are silanes, titanates, and zirconate. Silane coupling agents have the general formula $R^1R^2R^3$—Si—R, where $R^1$, $R^2$, and $R^3$ are each independently methoxy, ethoxy, 2-methoxyethoxy, and R is $C_1$-$C_{12}$ alkyl, $C_6$-$C_{14}$ phenyl, or $C_1$-$C_{12}$ fluoroalkyl. Specific examples of silane coupling agents operative herein illustratively include methyltrimethoxysilane, octyltrimethoxysilane, phenyltrimethoxysilane, trifluoropropyltrimethoxysilane, and combinations thereof. Titanate coupling agents have the general formula $(RO)_4Ti$, where R is independently in each occurrence $C_1$-$C_{12}$ alkyl, $C_6$-$C_{14}$ phenyl, or $C_1$-$C_{12}$ fluoroalkyl. Specific examples of titantir coupling agents operative herein illustrative include tetra-n-butyltitanate, tetra-isopropyl-titanate, and combinations thereof. Zirconate coupling agents have the general formula $(RO)_4Zr$, where R is independently in each occurrence $C_1$-$C_{12}$ alkyl, $C_6$-$C_{14}$ phenyl, or $C_1$-$C_{12}$ fluoroalkyl. Specific examples of zirconate coupling agents operative herein illustrative include zirconium isopropoxide, tetra-n-butyl zirconate, and combinations thereof. A coupling agent is typically present along with a siloxane and is present from 0 to 10 total weight percent and in specific embodiments between 0.5 and 5 total weight percent.

Depending on the solubility of the siloxane, emulsification of the reactive siloxane may occur using the cationic surfactant. Examples of suitable cationic surfactants include fatty acid methylammonium methosulphate, fatty acid methylammonium ethosulphate, fatty acid methylammonium acetate. Typically, the reactive siloxane oil-in-water (O/W) emulsion, if present, is contains 0.5 to 10 percent surfactant and 50 to 80% siloxane with the remainder being solvents. Water contained within emulsions as a carrier or other components is not counted toward total amounts of water in the following table or the appended claims.

Lesser amounts of secondary, water miscible solvents are included in some inventive embodiments that illustratively include dipropylene glycol n-propyl ether, dipropylene glycol n-butyl ether, diethylene glycol ethyl ether, diethylene glycol n-butyl ether, and water miscible alcohols. Water miscible alcohols operative herein include ethanol, propanol, isopropanol, butanol, sec-butanol, tert-butyl alcohol, isobutanol, pentanol, isoamyl alcohol, 2-methyl-1-butanol, neopentyl alcohol, 2-pentanol, 3-methyl-2-butanol, 3-pentanol, tert-amyl alcohol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 3,3-dimethyl-1-butanol, and combinations thereof. Secondary solvents are typically present from 0 to 10 total weight percent and in specific embodiments between 2 and 5 total weight percent.

A biocide operative herein illustratively includes CMIT/MIT, triclosan, para-chloro-meta-xylenol (PCMX), other conventional antibacterials, and combinations thereof. In specific inventive embodiments, an antimicrobial such as polyethyleneimine is included. Toxicity may be by two different mechanisms: the disruption of the cell membrane leading to necrotic cell death (immediate) and disruption of the mitochondrial membrane after internalization leading to apoptosis (delayed). The biocide is typically present from 0 to 15 total parts per million (ppm) and in specific embodiments between 5 and 15 ppm.

A wetting agent operative herein illustratively includes branched secondary alcohol ethoxylate, 8-11 EO, sulfo succinamates, disodium N-octadecylsulfo-succinamate; tetrasodium N-(1,2-dicarboxyethyl)-N-octadecylsulfo-succinamate; diamyl ester of sodium sulfosuccinic acid; dihexyl ester of sodium sulfosuccinic acid; and dioctyl esters of sodium sulfosuccinic acid; dihexyl ester of sodium sulfosuccinic acid; and dioctyl esters of sodium sulfosuccinic acid; castor oil and fatty amine ethoxylates; lecithin; fatty acids, salts thereof, ethanolamides thereof, and glycerides thereof; sodium polycarboxylate; sodium salt of naphthalene sulfonate condensate; calcium naphthalene sulfonates; sodium lignosulfonates; aliphatic alcohol ethoxylates; ethoxylated tridecyl alcohols; ethoxylated tristearyl phenols; sodium methyl oleyl taurate; tristyrylphenol ethoxylates; ethylene oxide-propylene oxide block copolymers; sodium dodecylbenzene sulfonate; N-oleyl N-methyl taurate; 1,4-dioctoxy-1,4-dioxo-butane-2-sulfonic acid; sodium lauryl sulphate; sodium dioctyl sulphosuccinate; aliphatic alcohol ethoxylates; nonylphenol ethoxylates; salts of maleic anhydride copolymers; n-octyl-2-pyrrolidone, polyvinylpyrrolidone; polyvinyl alcohols, modified or unmodified starches, methylcellulose; hydroxyethyl or hydroxypropyl methylcellulose; carboxymethyl methylcellulose; polyalkyleneimines, such as polyethyleneimine; and combinations thereof. In specific inventive embodiments, polyethyleneimine is included. The function of the wetting agent is to spread the bioactive ingredients on a variety of references such as plastics, metals, leathers, fabrics, and touchscreens. The wetting agent is typically present from 0 to 5 total weight percent and in specific embodiments between 0.1 and 1.5 total weight percent.

In some embodiments, a water repellent is present to impart water repellency to the resulting coating. Water repellency is imparted according to the present invention through resort to a cationic or anionic silane that include functional groups (e.g., functional groups attached directly to a silicon molecule, functional groups attached to another molecule on the silane compound, or a combination thereof. Functional operative herein illustratively include sulfonate groups, phosphonate groups, carboxylate groups, gluconamide groups, sugar groups, polyvinyl alcohol groups, quaternary ammonium groups, and combinations thereof. A water repellant is typically present from 0 to 5 total weight percent and in specific embodiments between 0.1 and 1.5 total weight percent.

In some embodiments, a pH modifier is present in an amount to achieve a composition pH of between 5 and 7. pH modifiers operative herein illustratively include amino-2-hydroxyethane, 2-[bis(2-hydroxyethyl)amino]ethanol, 2-amino-2-methyl-1-propanol, soda ash, sodium hydroxide, citric acid, and lime.

A viscosity builder is present in some embodiment of the inventive composition to improve handling properties. Viscosity builders operative herein are water soluble polymers that illustratively include poly(ethylene glycol), poly(ethylene oxide), poly(vinyl alcohol) and copolymers thereof, poly(N-vinyl pyrrolidone) and copolymers thereof, methyl cellulose, hydroxy Ethyl cellulose, hydroxypropyl cellulose, hydroxypropyl methyl cellulose, carboxymethyl cellulose, guar gum, hydroxyethyl guar, hydroxypropyl guar, gelatin, albumin, hydroxypropyl methyl guar, carboxymethyl guar, carboxymethyl chitosan, locust bean gum, carrageenan, xanthan gum, gellan gum, Pullulan, alginate, chondroitin sulfate, dextran, dextran sulfate, aloe vera gel, gum arabic, tamarind gum, poly(methyl vinyl ether), ethylene oxide propylene oxide ethylene oxide block copolymers, hyaluronan, chondroitin sulfate, keratan sulfate, dermatan sulfate, heparan sulfate, dextran, carbomer and salts thereof, poly (acrylic) acids) and salts thereof, poly(methacrylic acid) and their salts, poly(ethylene-co-acrylic acid), poly(vinyl methyl ether), poly(vinyl phosphate) salts, poly(vinyl sulfonic acid) salts, sodium poly(2-acrylamido-2-methylpropane sulfonate), polyacrylamide, poly(N,N-dimethyl acrylamide), poly(N-vinyl acetamide), poly(N-vinyl formamide), poly(glyceryl methacrylate), poly(2-ethyl-2-oxazoline), poly(N-isopropylacrylamide) and poly(N-vinylcaprolactam), and combinations thereof. The viscosity builder is typically being present from 0 to 5 total weight percent and in specific embodiments between 0.1 to 1.5 total weight percent.

A fragrance is typically present from 0 to 0.5 total weight percent and in specific embodiments between 0.05 and 0.3 total weight percent.

A UV stabilizer imparts resistance against UV radiation. Examples of UV stabilizers are benzotriazoles, benzophenones, triazines, hindered amine light stabilizers, 2-(benzotriazol-2-yl)-4-(2,4,4trimethylpentan-2-yl) phenol, 3,5-di-t-butyl-4-hydroxybenzoic acid, hexadecyl ester and combinations thereof. The UV stabilizers are typically present from 0 to 5 total weight percent and in specific embodiments between 0.5 and 1.5 total weight percent.

A preservative is present in some embodiments of the inventive composition. A preservative prevents microbial degradation and offers long term stability, and increases the overall stability of the composition. Preservatives operative herein illustratively include biphenyl-2-ol (ortho phenylphenol), 4,4-dimethyloxazolidine, 5-bromo-5-nitro-1,3-dioxane, 2-bromo-2-nitropropane-1,3-diol, 2,4-dichlorobenzyl alcohol, 5-chloro-2-(2,4-dichlorophenoxy)-phenol, 4-chloro-3,5-xylenol, 3,3'-bis-(1-hydroxymethyl-2,5-dioxo-imidazolidinyl-4-yl)-1,1'-methylenedlurea (imidazolidinyl urea), poly(l-hexamethylene biguanidine hydrochloride), 2-phenoxyethanol, hexamethylenetetramine, benzyl alcohol, 1,3-bis-(hydroxymethyl)-5,5-dimethylimidazolidone-2,4-dione, 5-chloro-2-methylisothiazol-3(2H)-one, 2-methylisothiazol-3(2H)-one, benzisothiazolinone, 2-benzyl-4 chlorophenol, chlorhexidine and its digluconate, diacetate, and dihydrochloride salts, 1-phenoxy-propan-2-ol, cetyl pyridinium bromide and chloride, N-(hydroxymethyl-N-dihydroxymethyl-1,3-dioxo-2,5-imidazolinidyl-4)-N'-hydroxymethyl urea, sodium hydroxymethylglycinate, benzethonium chloride, benzalkonium chloride, bromide and saccharinate, 3-iodopropynylbutylcarbamate, benzisothiazolinone, triacetin, diazolidinyl urea, and cis-1-3-chloroallyl-3,5,7-triaza-1-azoniaadamantane chloride, and combinations thereof. A preservative is typically being present from 0 to 5 total weight percent and in specific embodiments between 0.1 and 1.5 total weight percent.

A polymeric conditioning agent that may be used in embodiments of the inventive composition illustratively include dialkyl (each independently $C_{10}$-$C_{20}$) dimethyl ammonium chloride, alkyl ($C_{10}$-$C_{20}$) dimethyl benzyl ammonium chloride, and combinations thereof. Specific quaternary ammonium salts operative herein illustratively include octyl decyl dimethyl ammonium chloride, dioctyl dimethyl ammonium chloride, didecyl dimethyl ammonium chloride, and combinations thereof. Polymeric conditioning agents are typically present from 0 to 1 total weight percent and in specific embodiments between 0.05 and 0.3 total weight percent.

A process of application for an inventive composition to a surface includes dilution if provided as a concentrate, and otherwise the aqueous based composition is simply applied as formualted. Typical dilution schemes include volumes ratios of the inventive composition to water of 1:0-200. An inventive composition is readily applied to a substrate by swabbing, pump spray, or by application from a spray aerosol can. As such, a propellant is optionally added in a range from 5 to 95 total weight percent. Suitable propellants illustratively include alkanes such as butane, pentane, isobutane, propane; ethers such as dimethyl ether, diethyl ether, nitrogen; halogenated hydrocarbons; carbon dioxide and combinations thereof. The resultant formulation inclusive of a propellant is seated within a conventional metal aerosol canister and applied by spray application. Water is then allowed to evaporate from the composition to form a protective graphene film layer inclusive of the cross-linked siloxane and the silicone emulsion lipophilic components. The coating producing the shine and hydrophobicity is able to maintain durability subsequent to the application for several weeks under normal vehicle operating conditions. The protective film or fine/thin graphene film formed protects against mud, dust, dirty rain, water spots, and grime. The film forming process seals pores making the surface hydrophobic and having less surface roughness further contributing to the shine of the treated surface with such a coating formed from an inventive composition. In some embodiments, the graphene domain size and content is such that the resulting coating is transparent to an unaided, normal human eye. The film also forms a secondary bonding to the surface resulting in a sacrificial layer that is water and car wash resistant. These film layers repel dust and water and makes the surface easier to clean.

The formulary of an inventive composition is summarized below in Table 1.

TABLE 1

Inventive Cleaning and Surface Treatment Composition (exclusive of propellants).

| Component | Typical Amount Total Wt. Percent | Pref. Amount - Total Wt. Percent |
|---|---|---|
| Graphene | 0.01-0.1 | 0.01-0.1 |
| Surfactants (at least non-ionic) | 0.5-38 | 2.5-20 |
| Chelating agent | 0.1-1 | 0.2-0.6 |
| Water | Remainder | Remainder |
| Optional components | | |
| Siloxane | 0-10 | 0.5-5 |
| Coupling agent for siloxane | 0-10 | 0.5-5 |
| Water-miscible, secondary solvent | 0-10 | 2-5 |
| Biocide | 0-15 ppm | 5.0-15 ppm |
| Wetting agent | 0-5 | 0.1-0.5 |
| Water repellent (ionic silane) | 0-5 | 0.1-1.5 |
| pH modifier | to pH 5-7 | to pH 5-7 |
| Viscosity builder | 0-5 | 0.1-1.5 |
| Fragrance | 0-0.5 | 0.05-0.3 |
| Polymeric conditioning agents | 0-1.0 | 0.05-1.0 |
| UV stabilizer | 0-5 | 0.1-1.5 |
| Preservative | 0-5 | 0.1-1.5 |

include a siloxane, a siloxane coupling agent, a secondary solvent, a biocide, a wetting agent, a water repellent, a pH modifier, a fragrance, a viscosity builder, fragrance, a UV stabilizer, a preservative, Specific exemplary formulations of an inventive composition are provided, unless noted otherwise, all percentages for the specific formulation are total weight percentages. The advantages of this invention are more particularly shown by the following example in which the parts and percentages are by weight unless otherwise indicated.

Example 1

An inventive composition with a pH in a range of 5.0-7.0 and having a viscosity of between 4000-7000 cps, is created in a proportion of 1 oz formulation to 1 gallon of water that includes sodium lauryl sulfate (12%), $C_8$-$C_{16}$ alkyl poly glucosides (2.5%), $C_{12}$-$C_{14}$ amine oxide (1.5%), branched secondary alcohol ethoxylate, 8-11 EO (0.1%), hydroxypropyl guar gum (1%), diethylene glycol monobutyl ether (3%), disodium ethylenediamine tetraacetic acid (0.5%), graphene nanoplatelets (0.05%), silanol terminated polydimethylsiloxane (1.0%), phenyltrimethoxysilane (1%), dimethicone PG-diethylammonium chloride (1%), polyquaternium 39 (0.15%), sodium chloride (0.5%), citric acid (0.05%), an antimicrobial (7.5 ppm), and a fragrance (0.1%), the remainder being deionized water (75%). The parenthetical amounts being amounts by total weight percent. The resulting formulation is applied to a vehicle surface diluted 1:128 in water.

Example 2

Automotive, white-painted steel panels or automotive glass panels are uniformly covered with a soil composition of dust mixture, used motor oil, and water that are at 49° C. for 30 mins. The composition of Example 1 created a durable foam that was stable form up to 1 hour with an initial volume of 190 mL and was saturated into sponged that was passed over the soiled panels with controlled pressure in 3 cycles equivalent to 6 passes in an abrasion machine set-up. The composition is allowed to dry at room temperature. Colorimetry is performed on the resulting film coated painted panels to determine cleaning efficiency with 5 readings per sample (L-value reading) according to ASTM D2486 (mod.) and ASTM D4488 (mod.). A haze guard machine is used to determine cleaning efficiency on the glass panels with 5 readings per sample (L-value reading) according to ASTM D2486 (mod.) and ASTM D1003.

An average cleaning efficiency of 95% is noted for both the painted panel and glass panel. The average gloss increased+7 GU immediately after wash. The average gloss increased +10 to +15 GU following 24 hours versus just +5 GU for existing conventional car wash formulation. The average hydrophobicity increase after treatment is about 20° in term of contact angle measurement. Average hydrophobicity after 24 ours was 10°. The panels upon being exposed to four weeks of driving on the exterior of a vehicle show little, to no road debris build up.

Example 3

An inventive composition has a pH in a range of 6.5-7.5 and having a viscosity of between 500-2000 cps, is created that includes $C_8$-$C_{16}$ alkyl poly glucosides (7.5%), cationic silane (4%), nonionic thickener (0.8%), diethylene glycol monobutyl ether (3%), disodium ethylenediamine tetraacetic acid (0.3%), graphene nanoplates (0.4%), 1,2-benzisothiazolin-3-one (0.075%), and a fragrance (0.1%), the remainder being deionized water (84%). The parenthetical amounts being amounts by total weight percent. The resulting formulation is applied to a vehicle surface.

Example 4

The process of Example 2 is repeated with the composition of Example 1 with the proviso that the graphene dispersion is replaced with a like amount of average 4 layer multi-layer graphene nanoplatelets having an average domain size of 5 microns. Similar results are obtained.

Example 5

A comparative study was conducted between an existing graphene based car shampoo that is identified as shampoo A and an embodiment of the inventive graphene based car shampoo composition (identified as RX Pro™) as disclosed in example 1. FIG. 1 summarizes the two products in the comparative study including packaging, concentrate to bucket ratio, and foaming characteristics including pH level, scent, foam height, formulation color and consistency, and foam dissipation time. FIG. 2 is a chart summarizing performance parameters of the existing graphene based car shampoo (shampoo A) and the embodiment of the inventive graphene based car shampoo composition (RX Pro™) presented in FIG. 1. The chart of FIG. 2 grades (Excellent, Good, OK, Marginal) the comparative formulations for performance characteristics including cleaning, water beading, water dissipation, shin, lubrication, bucket foam, foam transference, foam dissipation, and fragrance.

Example 6

A comparative study was conducted between an existing formulations including products identified as graphene based car shampoo A, graphene car wash G, and high foaming car wash X that is identified as shampoo A and an embodiment of the inventive graphene based car shampoo composition (identified as Rain-X™ graphene car shampoo GCW 05-12SI). As shown in FIG. 3 the bar graph of foam height versus time the inventive formulation performs nearly identically to the shampoo A, and greatly outperforms the graphene car wash G and high foaming car wash X.

Example 7

Figure 4:
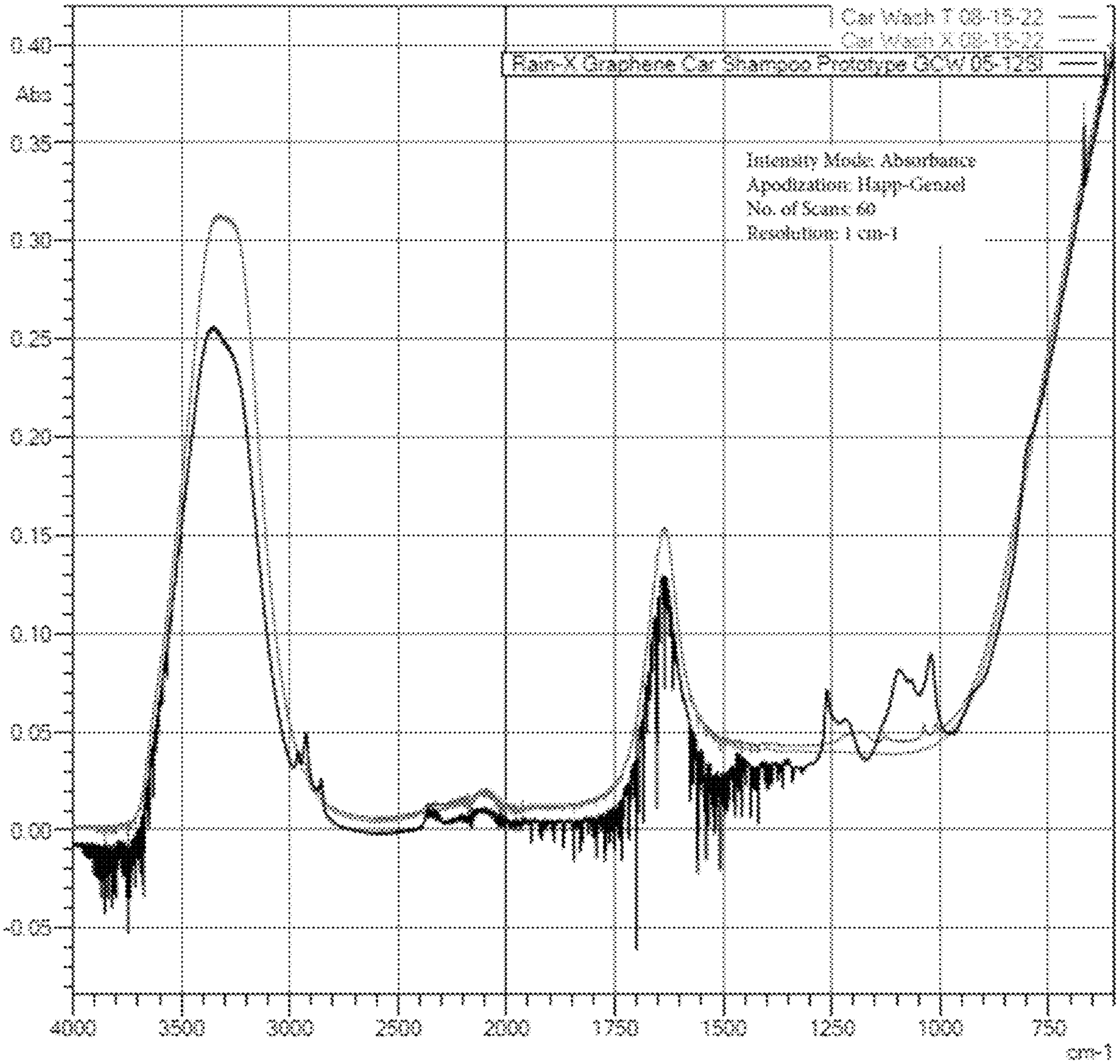
FIG. 4 is a spectra graph showing the results of Diamond Attenuated Total Reflection Fourier-transform infrared spectroscopy (ATR-FTIR) of two traditional car wash formulations in relation to the inventive embodiment of graphene based car shampoo composition (Rain-X™)
Figure 5:
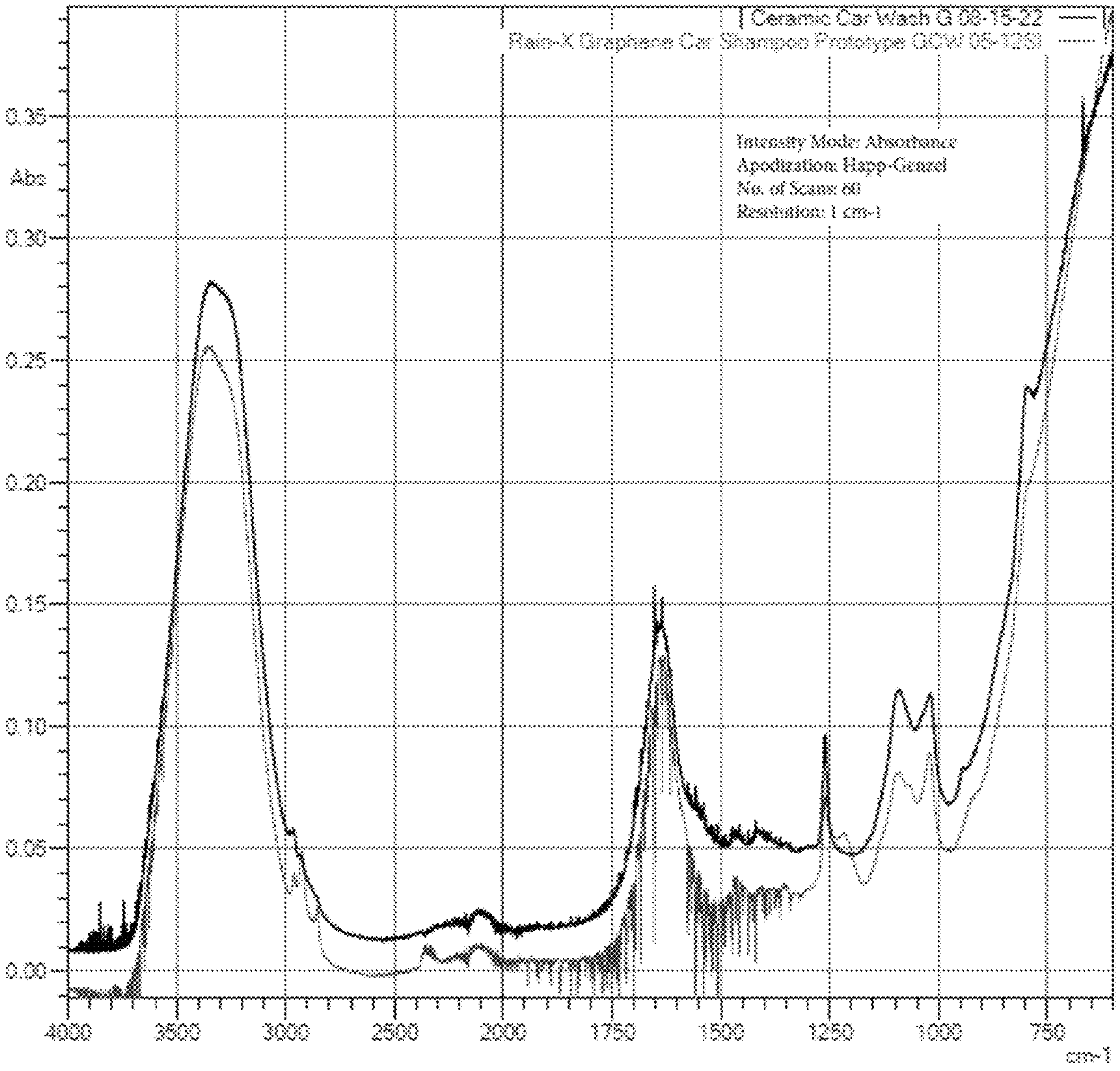
FIG. 5 is a spectra graph showing the results of Diamond Attenuated Total Reflection Fourier-transform infrared spectroscopy (ATR-FTIR) of an existing ceramic based car wash formulation relative to the inventive embodiment of graphene based car shampoo composition (Rain-X™)
Figure 6:
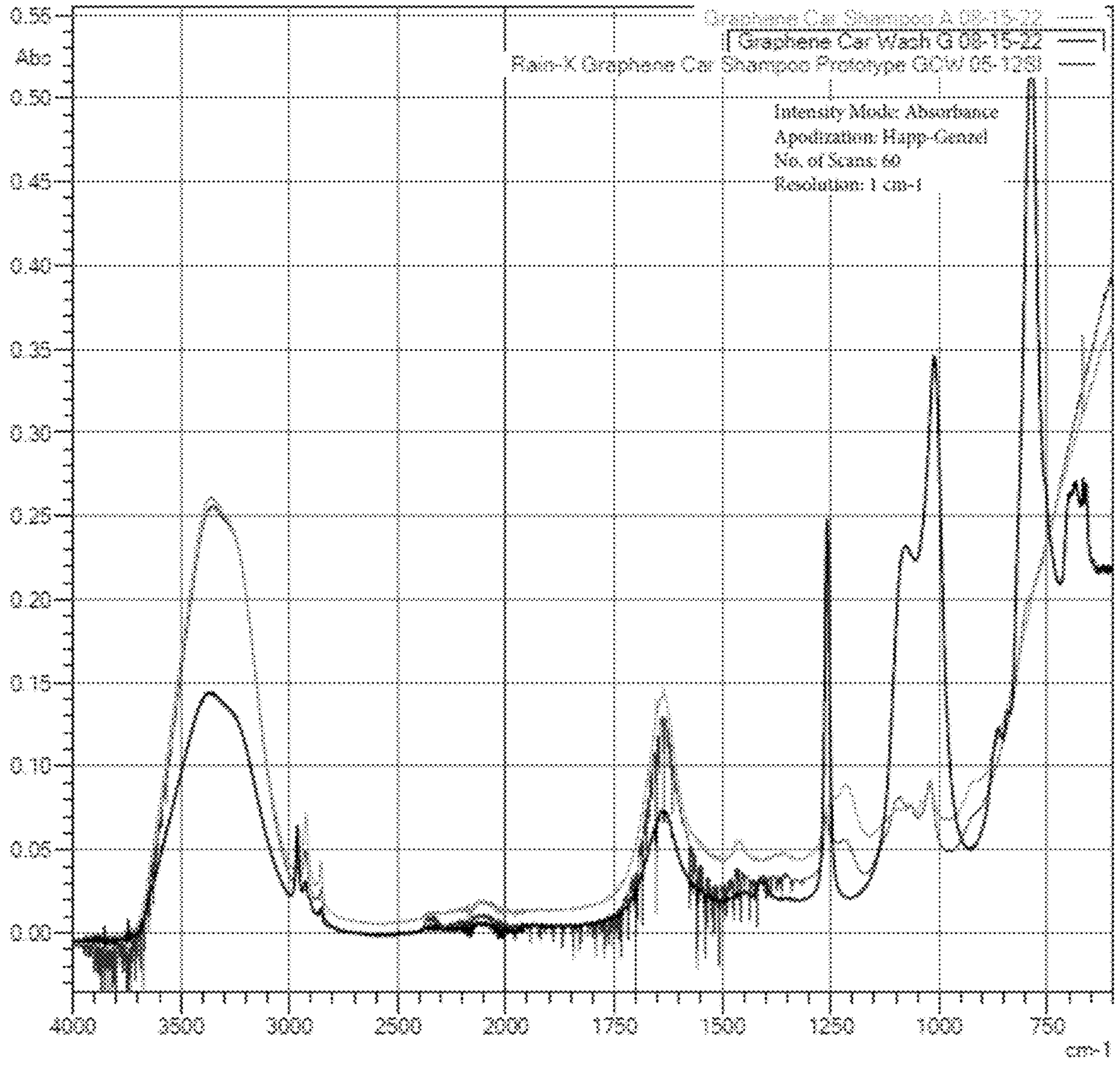
FIG. 6 is a spectra graph showing the results of Diamond Attenuated Total Reflection Fourier-transform infrared spectroscopy (ATR-FTIR) showing two existing graphene based car wash and shampoo formulations relative to the inventive embodiment of graphene based car shampoo composition (Rain-X™).

Fourier-transform infrared spectroscopy (FTIR) was performed using a diamond attenuated total reflection (ATR). FIG. 4 is a spectra graph showing the results of two traditional car wash formulations in relation to the inventive embodiment of graphene based car shampoo composition (Rain-X™). As shown in FIG. 4 the performance of the inventive formulation is similar to the existing car wash formulations for absorbance. FIG. 5 is a spectra graph showing the results of Fourier-transform infrared spectroscopy (FTIR) of an existing ceramic based car wash formulation relative to the inventive embodiment of graphene based car shampoo composition (Rain-X™). As shown in FIG. 5 the performance of the inventive graphene formulation is similar to the existing ceramic based car wash formulation for absorbance. FIG. 6 is a spectra graph showing the results of Fourier-transform infrared spectroscopy (FTIR) showing two existing graphene based car wash and shampoo formulations that were presented in Example 6 relative to the inventive embodiment of graphene based car shampoo composition (Rain-X™). Exclusive of the spikes in graphene gar wash G the three samples exhibit similar absorbance.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof are intended to define the scope of the invention.

The invention claimed is:

1. A process of imparting a coating to a vehicle surface comprising:

applying to the vehicle surface a composition as a foam stable form up to 1 hour, the composition comprising:

graphene;

surfactants; silanol-terminated polydimethylsiloxane and phenyltrimethoxysilane;

a chelating agent; and water as a majority by weight; and allowing a residual of the composition to form the coating on the vehicle surface, the silanol-terminated polydimethylsiloxane and phenyltrimethoxysilane forming a matrix of the coating in which the graphene is present with gloss increased +10 to +15 Gloss Units following 24 hours.

2. The process of claim 1 further comprising diluting the composition in water prior the applying.

3. The process of claim 1 further comprising wiping or rinsing away an excess of the composition prior to the forming of the coating.

4. The process of claim 1 wherein the vehicle surface is one or more of: a tire, exterior vehicle trim, interior vehicle trim, a dashboard, or door trim.

5. The process of claim 1 wherein the coating is transparent.

6. A vehicle surface coating composition comprising:

graphene;

surfactants;

a water miscible solvent comprising diethylene glycol monobutyl ether;

a chelating agent;

silanol-terminated polydimethylsiloxane and phenyltrimethoxysilane; and water as a solvent or dispersant and present as a majority by weight.

7. The composition of claim 6 wherein the composition further comprises: one or more of: a wetting agent, viscosifier, pH modifier, an antimicrobial, a Polymeric conditioning agents, a fragrance, a water repellant, or a combination thereof.

8. The composition of claim 6 wherein the graphene is 1 to 10 layers.

9. The composition of claim 6 wherein the graphene comprises graphene oxide.

10. The composition of claim 6 wherein the graphene is present from 0.01 to 0.1 total weight percent.

11. The composition of claim 6 wherein the surfactants comprise sodium lauryl sulfate, a $C_8$-$C_{17}$ alkyl poly glucoside, a $C_{12}$-$C_{14}$ amine oxide.

12. The composition of claim 6 wherein the chelating agent comprises disodium ethylenediamine tetraacetic acid.

* * * * *